(12) United States Patent
van Os

(10) Patent No.: US 7,705,493 B2
(45) Date of Patent: Apr. 27, 2010

(54) MAGNETIC MIRROR AIR BEARING FOR MICHELSON INTERFEROMETER WITH LATERAL MOTION

(76) Inventor: Ron van Os, 8016 S. Deer Creek Canyon Rd., Morrison, CO (US) 80465

( * ) Notice: Subject to any disclaimer, the term of this patent is extended or adjusted under 35 U.S.C. 154(b) by 0 days.

(21) Appl. No.: 12/221,369

(22) Filed: Aug. 1, 2008

(65) Prior Publication Data

US 2010/0027092 A1 Feb. 4, 2010

(51) Int. Cl.
*H02K 33/00* (2006.01)
(52) U.S. Cl. ..................... 310/23; 310/12.06
(58) Field of Classification Search ............ 310/12–24, 310/36–39; 356/452
See application file for complete search history.

(56) References Cited

U.S. PATENT DOCUMENTS

| 5,883,712 | A | * | 3/1999 | Coffin | 356/452 |
| 5,896,197 | A | * | 4/1999 | Coffin | 356/452 |
| 7,368,838 | B2 | | 5/2008 | Binnard et al. | |

* cited by examiner

*Primary Examiner*—Quyen Leung
*Assistant Examiner*—Leda Pham

(57) ABSTRACT

The invention claimed is a novel magnetic mirror air bearing for a Michelson interferometer with lateral motion. A precise kinematic mount is used in combination with magnetic fields wherein current can be applied on a centerline to move a piston and mirror laterally without pitch and yaw so as to effect accurate light beam reflection regardless of distance of lateral movement within a defined space. The assembly is able to operate across extended temperature ranges by utilizing materials which expand and contract at similar rates, and contains a thermalizing cavity which will thermalize the gas to avoid temperature induced artifacts.

10 Claims, 7 Drawing Sheets

MAGNETIC MIRROR AIR BEARING FOR MICHELSON INTERFEROMETER WITH LATERAL MOTION

FIELD

The invention relates to lateral movement of a magnetically driven air bearing to effect light beam reflection without angular distortion or temperature induced artifacts as is central to operation within a Michelson Interferometer.

BACKGROUND OF THE INVENTION

The invention most closely corresponds with USPTO Class 310, subclass 15 relating to electrical generator or motor structure wherein the invention involves subject matter in which the movable element of the dynamoelectric device moves to and fro along a straight line path or along an accurate path which is so short as to be substantially a straight line.

In its simplest form, the invention comprises a novel method and apparatus for moving a mirror laterally without angular distortion (pitch and yaw) so as to reflect a light beam in a desired and precise angle, and without temperature induced artifacts. In the present invention's realm, pitch and yaw refer to the attitude of a light beam reflected off a mirror in terms of a symmetrical beam wherein the directional stability in yaw is the same as the pitch stability.

In precision instruments, the accuracy of the instrument's performance is a crucial element. In re Binnard, et al., U.S. Pat. No. 7,368,838, a high efficiency voice coil motor is described wherein a manner of magnetic field application is used. Binnard, however, lacks many of the features contained in the present invention, and limits itself to specific types and shapes of magnets. Further, there is no elegant method of controlling the temperature of the Binnard assembly as exists in the present invention. These differences will be apparent to one skilled in the art as detailed within this Specification.

THE INVENTION

Summary, Objects and Advantages

The current art offers a multitude of pistons and functionality thereof. In the present invention, the piston is to be utilized in a Michelson interferometer, and is attached to a mirror whose lateral motion is driven by applied current to a magnet pair. The assembly is balanced such that gravity is barred from forcing the assembly to the relative floor of a cylinder or casing wherein contained regardless of position. The "assembly" includes a piston and mirror, a magnetic core, and primary winding inside said core.

The assembly is encased in a Pyrex cylinder and kinematically mounted to the instrument (interferometer) which allows alignment variation, specifically supporting lateral movement without pitch and yaw which would cause angular distortion of light reflection during mirror movement. As is known in the art, a kinematic mount is a method of attachment wherein combinations of fixed and adjustable mount points are used. In order to control the gravitational inclination of the piston and mirror to be forced to the relative floor of its encasing, a magnetic field is used to create a centerline wherein the ring shape of the magnets establishes the centerline. The shape of the magnets combined with precise mounting creates centerline force control which facilitates lateral mirror motion without angular movement which would affect light beam reflection.

The assembly utilizes a voice coil motor to introduce force (electric current) to drive the piston and mirror inside of the cylinder so that its movement is lateral as a result of force exerted on the established centerline. The weight of the piston and mirror assembly is such that gravity at a slightly angled mount is not an issue. The cylinder is a Pyrex tube wherein the assembly resides. For smooth operation of the assembly, the forces acting on the piston within the cylinder need to be aligned on the centerline to avoid angular momentums on the piston. The assembly utilizes permanent magnet sets strategically placed within the assembly. The permanent magnets are ring-shaped and mounted with their main axis coincident with the centerline. Similarly, the voice coil body and mirror support structures need to be well balanced around the center point of the piston to avoid angular movements due to gravity if the arrangement is used parallel to the earth's surface (normal to gravity).

A voice coil motor alone does not function in a spring-like manner, which is required in the present invention. By applying force to the magnetic pair, a shock absorption or spring motion can be achieved. In the present invention, distance and speed of movement can be said to occur based upon amount of force (electric current) applied. No current—the core does not move. As is well known in the art, opposite poles attract, and similar magnetic poles will repel one another. By applying standard polarity techniques, permanent magnets inside of the assembly are configured so as to control attracting or repelling forces using the magnetic field.

When current or force is applied appropriately, the magnetic field can be oscillated to produce a spring-like effect. To effect controlled motion of the piston inside the cylinder, a coil is placed around what we will term permanent magnet pair (A) of the voice coil assembly. By controlling the current through the coil, a precise centerline aligned force can be exerted on the piston for the purpose of controlling its motion. The force between two magnets of opposite polarity on the centerline between them scales with 1 over the distance squared ($1/d^2$) where d is the distance between the magnets. The force generated by the coil on permanent magnet pair (A) of the voice coil body is proportional to the current through the coil. For a counter clockwise current (positive current) the force is attractive, whereas for a counter clockwise current (negative current) the force is repellent. The soft iron core which makes up the support for permanent magnet pair (A), and forms the voice coil support body, is optimized to deliver a constant force with applied current regardless of the location of the permanent magnet pair (A) within the cylinder.

In the present invention, both a flat mirror and a corner cube mirror may be used. As is known in the art, a corner cube (retro-reflection) contains three flat mirrors. Flat mirrors are smooth, highly polished surfaces for reflecting light. The actual reflecting surface is usually a thin coating of silver, gold or aluminum on glass. Corner cube mirrors reflect the light back regardless of cube alignment to the incident beam with precision better than 20 microradians. The piston is mounted on one side to the voice coil body, and the other side of the piston allows the attachment of either an optically flat mirror, or corner cube reflector. The latter serves as the primary moving mirror in the Michelson interferometer.

The magnetic field utilizing dual magnet pairs is first accomplished by placing a pair of permanent ring-shaped magnets within the voice coil. These magnets are spaced to create a gap between themselves, and the piston which resides at rest in the center of the cylinder. Each magnet pair is mounted such that they repel each other. Affected by such a magnetic field, and without any applied external force, the piston will come to rest at the point where the repelling force from each magnet pair is equal. This self centering mechanism protects the sensitive optical surface during idle time, movement, and shipping of the units. This negates the need for a mechanical support structure for shipping the unit, greatly reducing complexity (and end user requirement for mounting such during movement/shipment of the unit).

As outlined above, the force required to effect piston travel from its at-rest position scales with ($1/d^2$). In the Michelson interferometer, it is desirable to achieve a constant motion of the movable mirror with respect to time, to ensure consistent data intervals in the data acquired. In the current arrangement this is accomplished by supplying a current which varies as $1/t^2$, where t=time. As the force on the piston scales linearly with the current through the coil we can write:

$$1/d^2 \propto 1/t^2 \text{ from which it follows that: } d \propto t$$

In other words, the distance of the piston and mirror from its at-rest position is directly proportional with time. With a bipolar current drive the piston can be accurately and linearly moved as shown in FIG. 4. Here 0 on the Y axis reflects the rest position, corresponding with zero current. The actual distance that the piston travels is a function of the maximum drive strength which provides accurate and precise control of the total piston/mirror travel. Furthermore, by introducing an offset in the current drive, the piston moves from a different location than the one wherein it is at rest, allowing full control of both piston center position and range of motion. The speed at which the current drive signal changes with time sets the piston travel speed. All three items are crucial for proper operation of a Michelson interferometer and are accomplished here with minimal complexity and inherent non contacting mechanical limits to remove the potential of damage from excessive piston excursions.

Resolving the potential for the piston to collide with either side of the internal assembly, two avenues are explored. Recall that the amount of force required to cause the permanent magnet pair (A) to come into contact with one another is very high, and therefore unlikely. An optional embodiment of the present invention is to have a second magnet pair (B) located on the mirror side of the assembly which is also force controlled and thus create similar field preclusion for completely closing any gap between the mirror and side of the assembly. Without a second magnet pair (B), a mechanical stop can be utilized to preclude the piston and mirror to make contact with the end of the cylinder.

Because of the inherent inductance of the coil, the piston speed has an upper limit of around 20 mm/s for a typical commercial voice coil motor assembly. For a well balanced piston, the minimum speed achievable is better than 0.01 um/s. This large range of operation in speed while maintaining precise angular tolerances greatly improves upon existing movable mirrors for Michelson interferometer designs Precision instrument's performance can be negatively affected by thermally induced artifacts. The inventive assembly residing within the cylinder contains space wherein gas is introduced by normal operation. The gas within the cavity needs to escape, yet is required to remain at a constant temperature. The assembly is open on the side of the mirror and enclosed where the piston faces the magnet pair and voice coil motor. The gas (typically pure nitrogen) is essentially trapped between the piston, the mount and cylinder wall. Precise apertures are drilled inside the mount connecting it to a chamber designed to allow the gas to equalize with its surroundings.

The ideal gas law states that PV=kT (pressure times volume is proportional to gas temperature). At higher piston speeds, the gas has less time to escape the apertures and the volume becomes compressed, resulting in an increase of the gas's temperature. When this gas is allowed freely into the instrument, the gradient causes measurement artifacts which may limit the precision of the instrument. To avoid artifact errors, the gas is thermalized in the chamber connected with said apertures. To enhance the thermal exchange, the chamber is filled with a thermally conducive material such as copper/brass wool. This chamber doubles as the inlet gas chamber to insure that the gas is at equal temperature with the instrument at all times. The apertures are designed to provide additional damping of the piston motion at higher speeds. This additional damping further reduces any cogging of the piston inside the cylinder to maintain angular tolerances. The assembly is designed to operate over wide temperature ranges because of the Pyrex and graphite materials utilized which expand and contract at the same rate. The self lubricating piston (graphite) requires no maintenance over the life of the instrument, and the thermal conductivity of the piston prevents heat buildup on the friction surface.

An optional embodiment of the assembly may include removing the second magnet pair B and utilizing a mechanical stop for the piston and mirror located on the mirror side of the assembly. The movement via applied current described above is essentially the same, however the mechanical stop serves to prevent collision of the piston and mirror with the end of the cylinder and any other mechanical parts of the structure.

Another embodiment is to use an electrical motor with permanent magnet stator to cause the piston and mirror to spin. Field coils located outside the cylinder apply current which cause the magnets on the piston to create a spinning momentum. The stator magnets should have alternating north-south position for control of attractive or repellant force. The stator is made of permanent magnets. The spinning movement, without any centrifugal force, causes the piston and mirror to remain centered, and thus avoid angular momentum (pitch and yaw).

BRIEF DESCRIPTION OF THE DRAWINGS

The invention is described in further detail by reference to the drawings in which.

DETAILED DESCRIPTION, INCLUDING BEST MODES OF CARRYING OUT THE INVENTION

The following detailed description illustrates the invention by way of example, not by way of limitation of the principles of the invention. This description will clearly enable one skilled in the art to make and use the invention, and describes various embodiments, adaptations, variations, alternatives, and uses of the invention. The description includes what are presently believed to be the best modes of carrying out the invention.

In this regard, the invention is illustrated in 7 relatively simple figures; although sufficiently complex as to illuminate to one skilled in the art of such architecture, and methods viable for making or using said invention.

Figure 1:
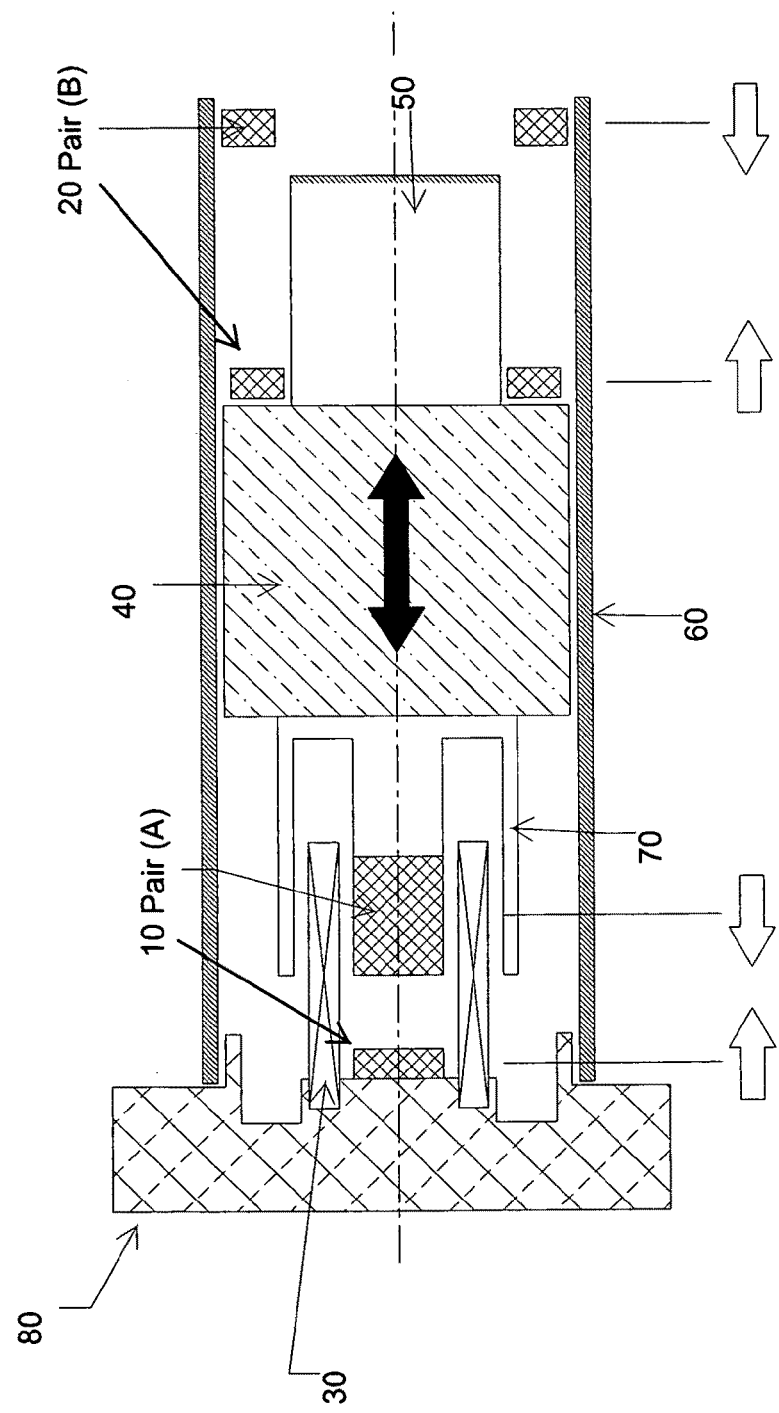
FIG. 1 is a complete view of the assembly and its parts.

FIG. 1 is a complete view of the inventive assembly. Permanent magnets 10 and 20 are shown as mounted within a drive coil 30 which will conduct current for applied force needed to move the piston 40 and mirror 50. In this Figure the mirror 50 is a flat mirror. The cylinder 60 is shown as encasing the assembly on the upper and lower portions. A soft iron voice coil motor body 70 is attached to the piston 40. A support in the kinematic mount structure 80 is also depicted wherein such support provides stability to the assembly.

Figure 2:
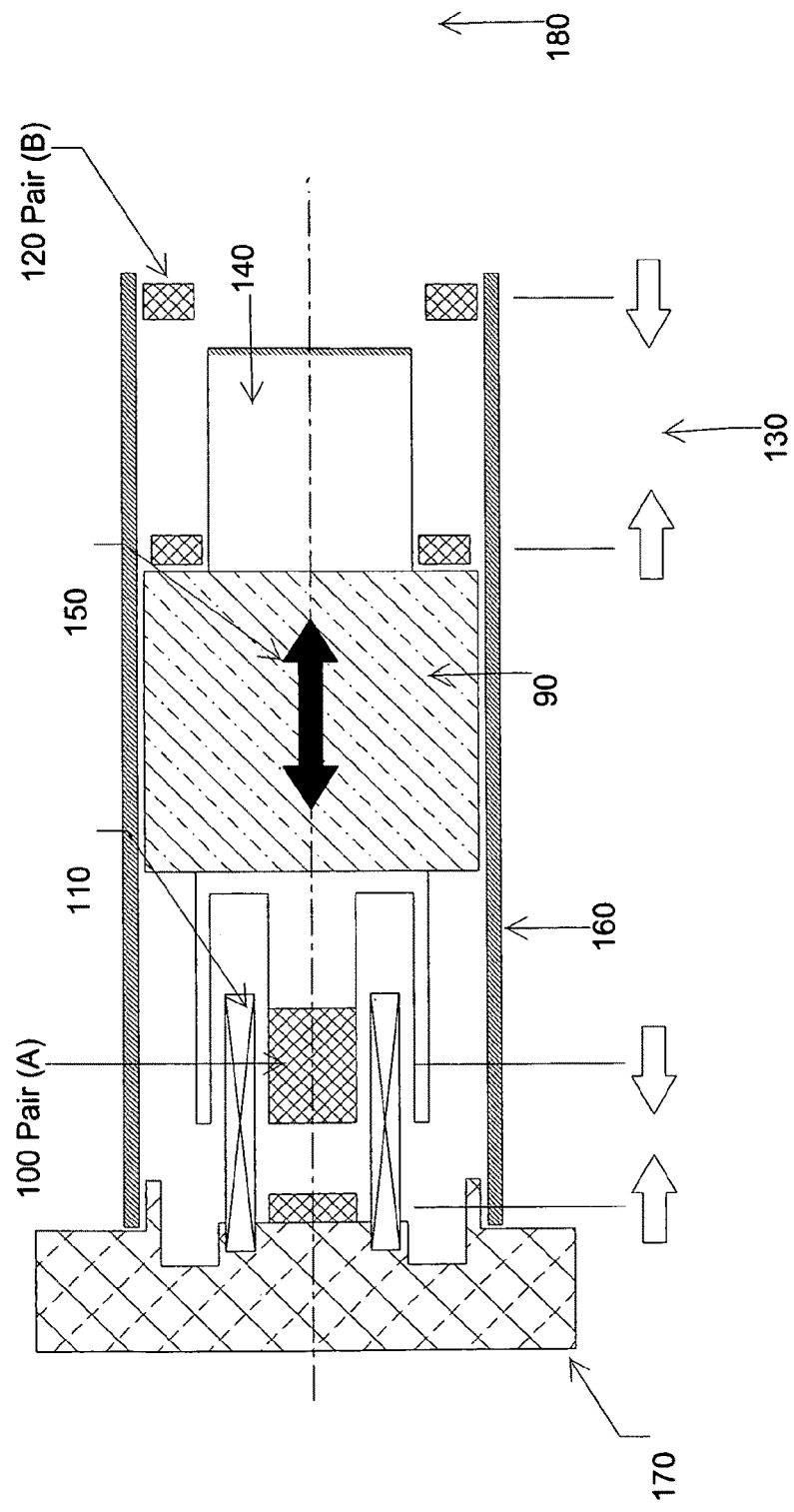
FIG. 2 provides functional description of the items in FIG. 1.

FIG. 2 depicts the functional aspects of the assembly. With the piston 90 at rest and no force or current applied, the piston does not move. This "at rest" position is determined by the balancing of permanent magnet pair (A) 100. When current is applied to the coil 110, the balance of permanent magnet pair (A) 100 will shift to cause the piston 90 to move to a new location and become at rest at that location. Lateral movement to this new location is allowed by additional shifting of the balance of permanent magnet pair (B) 120 so as to reduce the gap 130 on the mirror side of the assembly.

Further to FIG. 2, the constant current driven through the coil 110 allows for precise control of the static position of the piston 90 and mirror 140. The amount of force required to set the piston position is dependent upon the distance from its rest position by $(1/d^2)$. To move the piston 90 one unit in either direction 150, a current of 1 unit is required; to move the position two units, four units of current are required. As there is a limit as to how much current can be driven in the coil this automatically restrains the motion of the piston 90 within the cylinder 160, avoiding collisions with the support structures 170, 180 at each end of the cylinder. This restraint is inherent to the mechanical assembly which greatly simplifies the electrical design of the coil current drive circuit.

Figure 3:
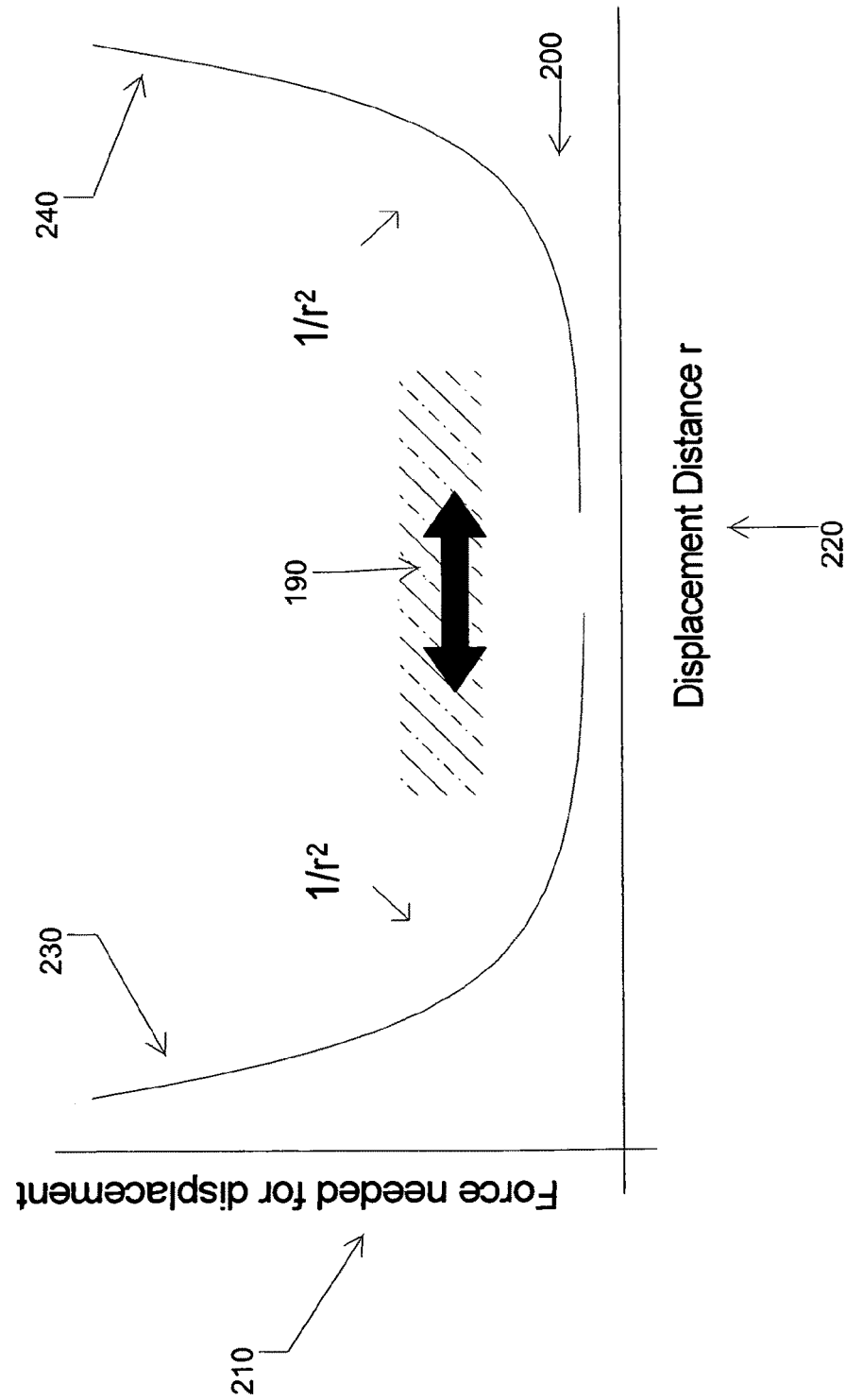
FIG. 3 depicts the piston in an at rest or stable position.

FIG. 3 depicts the current curve as required to force the piston 190 to travel over distance 200. The Y axis 210 depicts the force needed for piston displacement. The X axis 220 depicts the distance the piston has been displaced. When positive current has been applied, the force travels in a clockwise direction 230. Conversely, when negative force is applied, the force travels in a counter clockwise direction 240. When no current is applied, the piston 190 remains in an at rest position essentially in the center of the cylinder.

Figure 4:
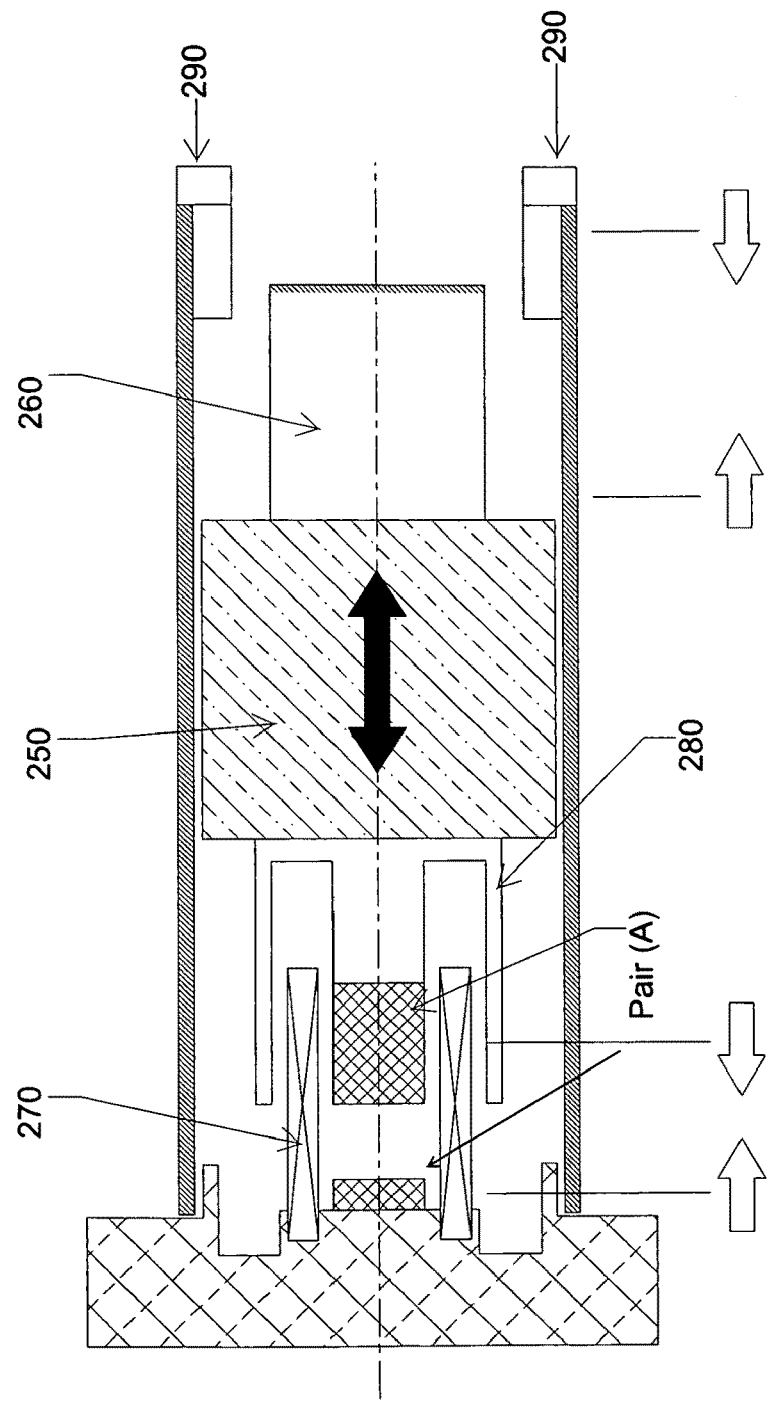
FIG. 4 illustrates an alternate embodiment utilizes a single magnet pair and mechanical stop for the piston/mirror.

FIG. 4 is an illustration of the assembly wherein a second pair, or formerly described magnet pair B is not utilized. The piston 250 and mirror 260 movement is driven from the current applied through the voice coil 270 and magnet pair A 280 as before. In this embodiment, a mechanical stop 290 is placed on the mirror side of the cylinder. This mechanical stop can be made of soft plastic or rubber.

Figure 5:
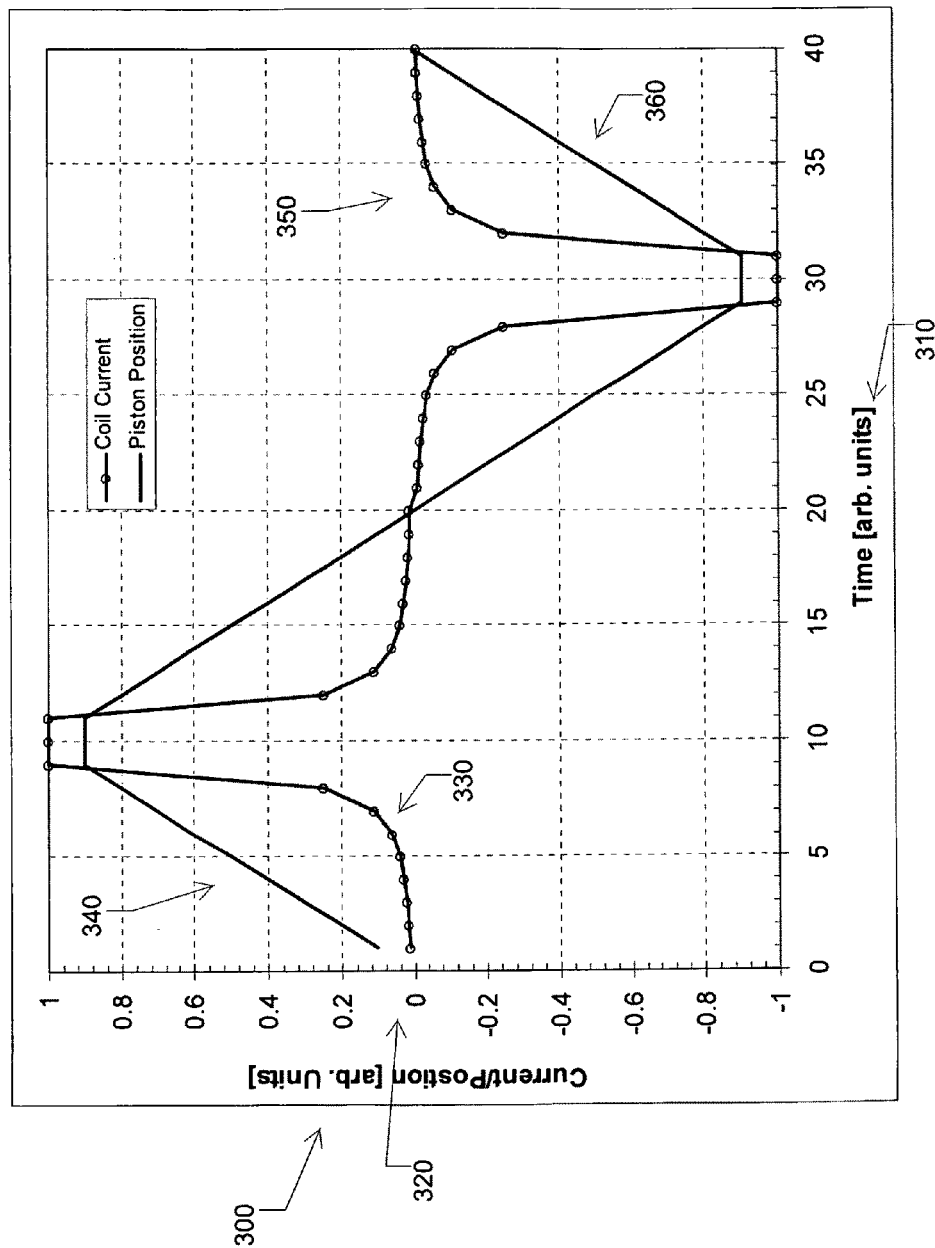
FIG. 5 is a graph depicting piston movement over time/distance as a result of force applied.

FIG. 5 graphs the salient feature of the present invention. Graphed is the relationship between piston and mirror movement over time and distance. The Y axis 300 represents the applied current and position of the piston. The X axis 310 depicts the piston movement over time as a result of applied current. Zero on the Y axis 320 represents the piston in its at rest position, i.e. no current applied. As positive current is applied 330, the movement can be said to be clockwise and the piston travels over distance 340 dependant upon the time of current applied. When negative current is applied 350, the movement is counter-clockwise which allows the piston to move in the opposite direction 360. Thus, we can say that based upon current, the piston and mirror can move to and fro within the cylinder.

Figure 6:
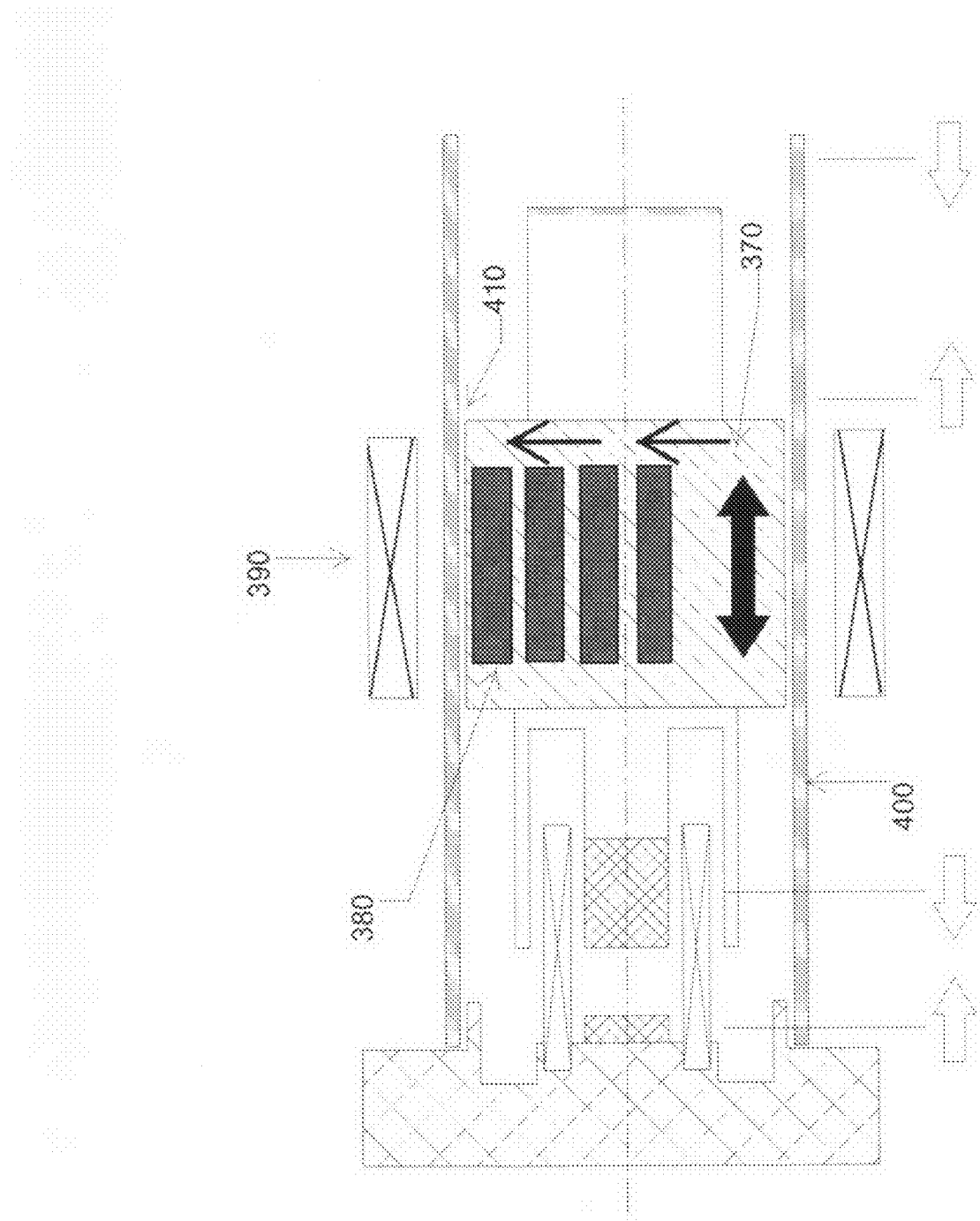
FIG. 6 represents an alternative embodiment utilizing a spinning piston and mirror to control angular stability.

FIG. 6 represents an alternate embodiment wherein an electrical motor and stator are used to cause the piston and mirror to spin. The piston 370 is the stator and the magnets 380 ringed in alternating north-south positions react to the current applied by the field coils 390. This force will cause the piston and mirror to spin around the centerline. The resultant spinning will induce an impulse momentum, further reducing the pitch and yaw of the assembly. Thus, we have an alternate method for avoidance of pitch and yaw within the small gap 410 between the piston and mirror and the inside of the cylinder 400.

Figure 7:
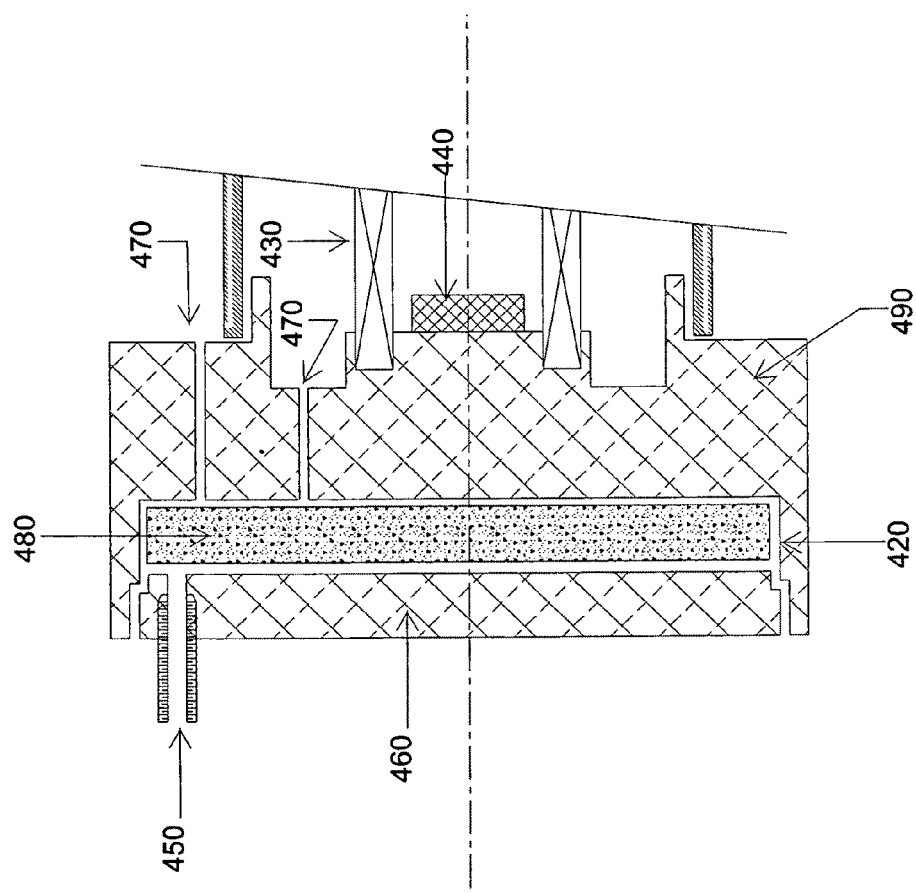
FIG. 7 illustrates the thermalizing cavity (or chamber) wherein gas (air) is thermalized.

FIG. 7 illustrates the thermalizing cavity (or chamber) 420 wherein gas (air) is thermalized to insure that the gas is at equal temperature with that of the instrument at all times. The cavity 420 also serves as the inlet gas chamber to insure said temperature equalization. The voice coil 430 and a single permanent magnet 440 are again depicted for reference of the cavity in relation to the assembly. An inlet 450 is drilled inside the enclosing member preceding the cavity 460 to allow gas to flow through the cavity and equalize with its surroundings. Contained in the cavity 420 is a thermally conductive material such as brass or copper wool 480 which enhances thermal exchange. Outlets or capillaries 470 are drilled through the mount 490 on the opposite side of the cavity to allow release of the gas. Only one set of outlets is shown, however, in the present embodiment, multiple appertures are drilled in a circular pattern centered on the centerline.

The invention claimed is:

1. A magnetic mirror air bearing with static lateral motion comprising;
    a) a piston and mirror assembly mounted inside a cylinder which cylinder is kinematically mounted to an interferometer;
    b) ring-shaped permanent magnets placed strategically within the cylinder;
    c) a voice coil motor to provide current control of its magnetic field in such a manner as to control piston and mirror movement over distance and time;
    d) a gap between the piston and mirror assembly and the wall of the cylinder to allow free lateral movement of the assembly while angled movement is restricted;
    e) a mount which secures the piston and mirror assembly, and the surrounding cylinder to an interferometer housing; and
    f) a chamber surrounding the mount of the assembly wherein apertures are drilled and said chamber is filled with a thermally conductive material such as copper or brass wool to allow gas flow and equalization of gas temperatures with those of their surroundings.

2. A piston and mirror assembly as in claim 1 wherein the piston is made of graphite, and the mirror may be a flat mirror or corner cube.

3. Magnets as in claim 1 wherein said magnets are ring-shaped, and mounted to the voice coil motor body and support structure in proper polarity so as to cause a repellant or attracting force while also providing a centerline force within the cylinder as relates to the assembly.

4. A voice coil motor as in claim 1 wherein current is supplied to the magnets providing constant lateral motion of the piston and mirror assembly from an at-rest position wherein such at-rest position is determined by lack of force or current applied.

5. Application of current as in claim 4 wherein the force required to move the piston and mirror assembly is directly related to the relationship of distance and time and provides accurate control of total travel wherein $1/d^2 \propto 1/t^2$ or $d \propto t$.

6. A gap or space between the assembly and inner wall of the cylinder as in claim 1 wherein the centerline force restrains the assembly against pitch and yaw as determined by the established centerline while allowing smooth lateral movement of the assembly.

7. The magnetic mirror air bearing of claim 1 wherein a second set of permanent magnets are mounted on the opposite end of said cylinder in proper polarity so as to create force control which prevents the piston and mirror assembly from contacting the end of the cylinder or related support structures.

8. The magnetic mirror air bearing of claim 1 wherein a stator driven by an electrical motor is used to cause spinning of the piston and mirror assembly which maintains the assembly in position avoiding pitch and yaw.

9. The magnetic mirror air bearing of claim 7 wherein a mechanical stop can be placed on the mirror side of the assembly in lieu of a second magnet pair to prevent impact with the end of the cylinder or related support structures.

10. The chamber of claim 1 wherein apertures are drilled into the mount containing the assembly to allow gas to flow between the natural spaces within the assembly and the chamber wherein said chamber is filled with brass or copper wool to enhance thermal exchange and equalize the gas temperature with that of its surroundings.

* * * * *